Oct. 18, 1932.  E. R. BARRETT  1,883,472
GRAVITY DUMPING BODY HOIST
Original Filed Aug. 15, 1927  2 Sheets-Sheet 1

Inventor
Edward R. Barrett
By Frank E. Liverance, Jr.
Attorney.

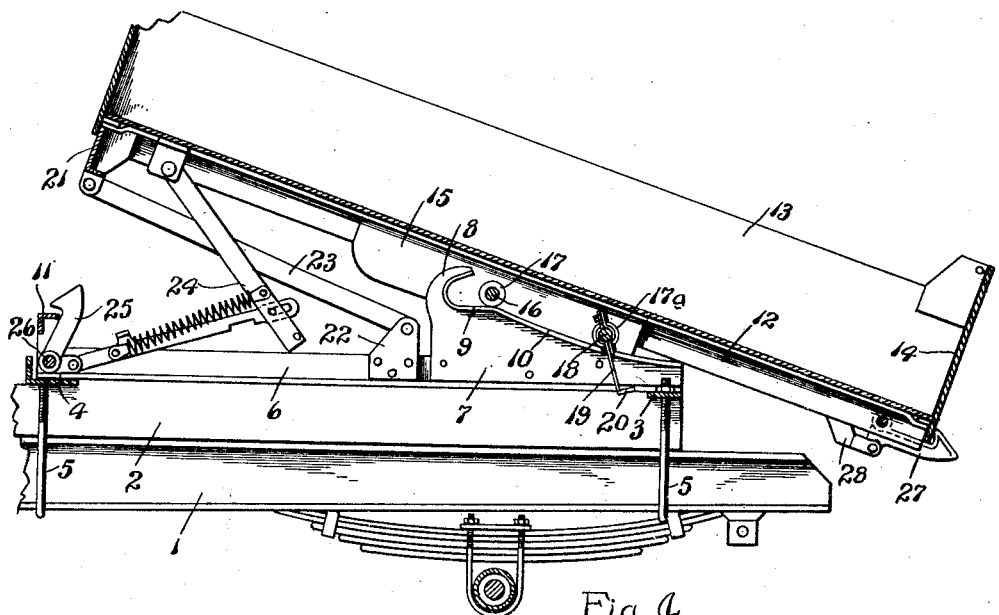

Patented Oct. 18, 1932

1,883,472

UNITED STATES PATENT OFFICE

EDWARD R. BARRETT, OF DETROIT, MICHIGAN, ASSIGNOR TO WOOD HYDRAULIC HOIST & BODY COMPANY, OF DETROIT, MICHIGAN, A CORPORATION OF MICHIGAN

GRAVITY DUMP BODY HOIST

Application filed August 15, 1927, Serial No. 212,992. Renewed April 24, 1931.

This invention relates to a gravity dumping body apparatus designed particularly for application to bodies mounted upon trucks or like vehicles. It is a primary object and purpose of the present invention to provide a dumping aparatus for a truck body which, with the body located in its normal horizontal position, serves to mount the body so that when it is unlatched and free for dumping movement it will normally tilt by gravity, the front end rising and the rear end dropping down; and at the same time simultaneous with such movement and as it is continued the body with the contents thereof is automatically given a rearward "carryback" movement and the axis about which it tilts is changed, this occurring as the center of gravity of the load or contents shifts rearwardly in the body during the tilting thereof, whereby when the body is at fully tilted position the center of gravity thereof is ahead of the last axis about which it has tilted and hence the body will readily return toward normal horizontal position when free to do so after the load or contents of the body has been discharged. A further object and purpose of the invention is to provide dumping apparatus for tilting a body as described which is simple, strong and durable and capable of withstanding the severe usage to which it is subjected and yet very practical and effective for the purposes for which it is designed.

Many other objects and purposes than those stated, together with operative constructions for attaining the same, will appear as understanding of the invention is had from the following description taken in connection with the accompanying drawings, in which, Fig. 1 is a longitudinal vertical section through a truck frame with a body mounted thereon, showing the dumping apparatus of my invention applied thereto.

Fig. 4 is a view similar to that shown in Fig. 1, illustrating the body in the first stage of tilting, and Fig. 5 is a like view showing the body when it has been tilted to the extreme upper position.

Like reference characters refer to like parts in the different figures of the drawings.

Figure 1:
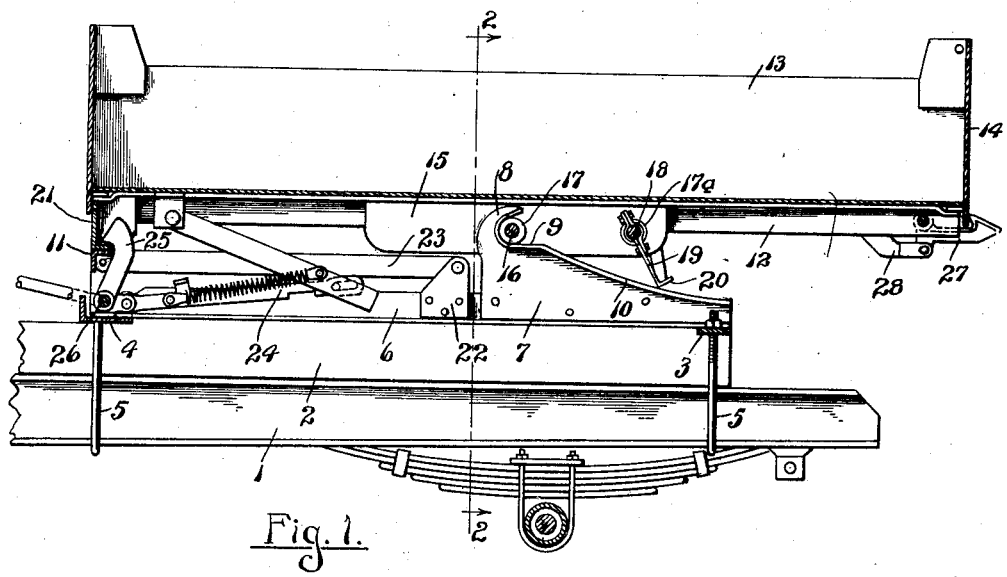
Figure 2:
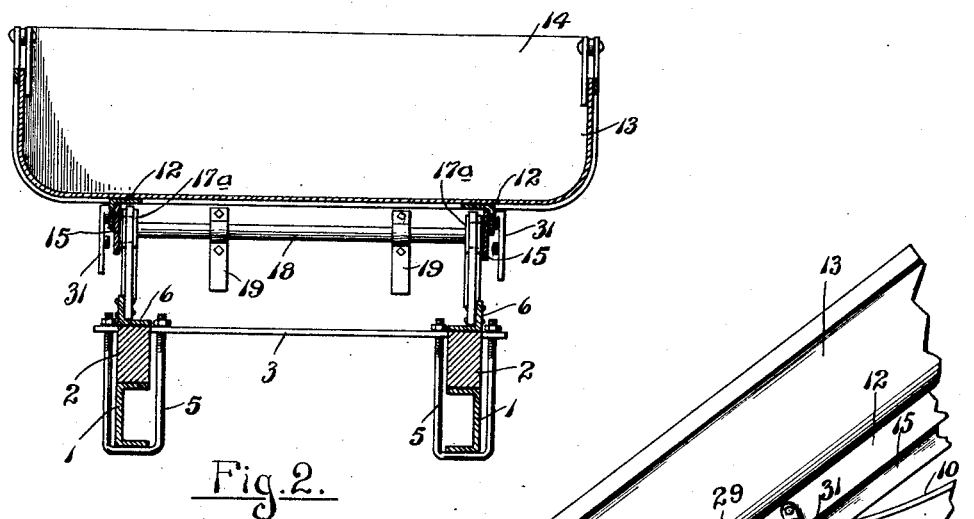
Fig. 2 is a transverse vertical section through the construction shown in Fig. 1 substantially on the plane of line 2—2 of Fig. 1 looking toward the rear.

The invention is primarily designed for use on motor trucks and in the drawings the chassis side frame members of the truck are indicated at 1, spaced apart in the usual manner. Above each of the frame members 1 a beam 2 of wood is located lying upon the upper flange of its associated side frame member. A flat cross bar 3 extends between and over the rear ends of the beams 2 and an angle bar 4 extends between and over said beams near their front ends. U-bolts 5 are made use of, the same embracing the frame members 1 and passing through bars 3 and 4, receiving nuts at their upper ends for tightly clamping the beams to the side frame members.

At the upper side of each of the beams 2 an angle bar 6 is located and permanently secured. The outer side of the vertical flanges of the angle bars 6 are substantially flush with the outer sides of the beams 2 and the horizontal flanges of said angle bars extend inwardly toward each other. Secured to the vertical flange of each of the angle bars 6 and bearing upon the horizontal flange thereof is a supporting and track member 7 which, at its upper front corner, is formed with a hook 8 having its open side to the rear. The upper side of each of the members 7 back of the hook 8 is formed horizontal, as indicated at 9, for a short distance and then extends downwardly and to the rear, as indicated at 10, with a gradual slope, the angle of which changes direction so that the surface 10 is substantially the arc of a circle of large radius. The parts indicated at 9 and 10 are widened to serve as tracks for the rearward movement of the truck body as will later be described. On the angle cross bar 4 a supporting post 11 is rigidly secured for carrying the front end of the body when it is in lower horizontal position.

In the construction of the body two parallel spaced sills 12 of angle iron are used to which the body 13, of sheet metal or other desired construction, is permanently secured. The body 13 is of a conventional construction having an open rear end which is to be closed by a tail gate 14 pivotally mounted to swing about an upper horizontal axis as is usual in devices of this character.

To the vertical downwardly extending leg of each of the sills 12 a vertical plate 15 is permanently secured. A rod 16 extends horizontally between said plates, being located substantially midway between the ends of the plates 15, and on said rod rollers 17 are mounted in a position that they may bear upon the track surfaces 9 or be received within the hooks 8. A second rod 18 extends between the plates 15 a distance back of the first rod or shaft 16 and it likewise carries rollers 17a which in certain positions of the body may traverse the tracks 10. Also attached to the rod 18 are a plurality of depending short bars 19, two being shown, which at their lower free ends are bent at right angles to the rear making the hooks 20 shown.

At the front end and lower side of the body 13 a supporting post or bracket 21 is permanently secured, the lower side of which comes against the upper end or side of the post 11 previously described when the body is in normal horizontal position. Immediately in front of each of the members 7 a bracket 22 is permanently secured to the vertical leg of each of the angle bars 6, and a link 23 is pivotally connected at its rear end to each of the brackets 22, said links at their front ends extending to and having pivotal connection with the post 21.

Between the lower side of the body 13 and the angle cross bar 4 a structure for limiting the upward tilting of the front end of the body is interposed, being indicated as a whole by reference character 24. The specific detail of this construction is not important in the present application, it forming the subject matter of a prior application for patent by me, Serial No. 25,979, filed April 27, 1925, now Patent No. 1,743,094, dated January 14, 1930. Also the attaching hook 25, mounted on a rock shaft 26 to engage with the post 21 when the body is in lower horizontal position, is shown but need not be further described, it also being fully disclosed in the prior application to which reference is made.

When the body is in lower horizontal position and latched therein as shown in Fig. 1, the rollers 17 are received within the hooks 8 and the center of gravity of the body carrying a normal load is a distance back of the axis of the shaft 16. When the latch 25 is released the body normally tilts by gravity to the position shown in Fig. 4 or until the rollers 17a come against the track surface 10. The tilting of the body is accompanied by a rearward movement thereof caused by the link members 23 which, being secured to fixed brackets 22, cause the body to be carried back, the rollers 17 moving upon the track surfaces 9. The tilting of the body to the position shown in Fig. 4 with the normal tendency of the load to shift to the rear because of such tilting shifts the center of gravity of the body and load so that the tilting movement will continue about the axis of the rod 18. At the same time the carrying back movement continues by reason of the links 23, rollers 17a traversing the tracks 10. The tilting continues until stopped by the limiting structure 24. In addition the hooks 20, engaging against the front edge of the cross bar 3, as shown in Fig. 5, limit the carrying back movement of the body as will be understood. The load, being dumped, it is then evident that the center of gravity of the body alone is forward of the axis of the rod 18 and that when the structure 24 is broken to the rear by rocking shaft 26 and causing a rearward movement of the latch 25, the body will automatically return to the position shown in Fig. 4, moving forward simultaneously with the downward movement of the front end; and that when the position shown in Fig. 4 is reached the body may be then moved to horizontal position either because of its momentum or with the aid of the driver of the vehicle, automatically latching as soon as it reaches horizontal position.

Figure 3:
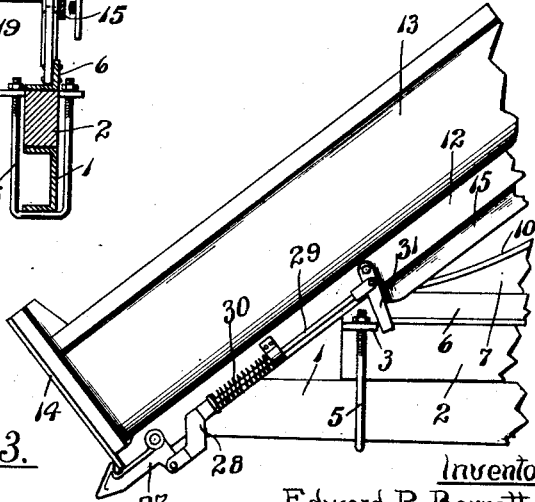
Fig. 3 is a fragmentary side elevation of the rear portion of the body and truck frame on which it is mounted, illustrating the manner in which the tail gate latches may be automatically released when the body reaches its fully tilted position.

The tail gate 14 may be automatically released when the body has been tilted to its extreme upper position if it has not been manually released previously. The latches 27 for the tail gate are pivotally mounted on the sills 12 and are operated through a member 28 and the rod 29 connected therewith by drawing said rod and member 28 horizontally forward against the spring 30 which tends to hold the latches in operative position. This forward movement of the rod 29 may be accomplished manually by engaging the handles 31 carried with said rod and pivotally mounted on the sills 12. If the latches are not manually released, when the body reaches its upper tilted position said handles at their lower ends and rear edges come against the front edge of the cross bar 3, as shown in Fig. 3, whereupon there is an automatic movement of the latches 27 to releasing position.

The construction shown and described is very practical and effective, simple and economical to make, very durable and has proved especially satisfactory, particularly with the smaller sized trucks though it is in no sense limited to the smallest of trucks used. The invention is defined in the appended claims and is to be considered comprehensive of all forms of structure coming within their scope.

I claim:

1. In a construction of the class described, a truck frame having spaced apart side frame members, a track member carried one above each of said side frame members toward the rear ends thereof, each of said track members having an upper track surface horizontal for a short distance at its front end and inclined downwardly and to the rear back of said front horizontal track portion, a truck body located above said truck frame and track members, a horizontal shaft attached to and located transversely of and below the body a short distance forward of the center of gravity of said body, rollers on said shaft normally bearing on the horizontal portions of said tracks, a second shaft parallel to and back of the first shaft and located a short distance back of the center of gravity of the body, said second shaft being attached to and disposed below the body, rollers on the second shaft located above the rear downwardly inclined portions of said tracks and out of engagement therewith when the body is in horizontal position, said rollers engaging with the downwardly inclined rear portions of said tracks after the body has been tilted about the axis of the first shaft to a predetermined position.

2. A construction containing the elements in combination defined in claim 1, combined with means for simultaneously and automatically moving the body to the rear on said tracks when it is tilted upwardly at its front end about the axes of said shafts.

3. A construction containing the elements in combination defined in claim 1, combined with links pivotally connected at their front ends to the truck body at its front end and lower side and pivotally connected at the rear ends by pivots relatively stationary with respect to the truck frame substantially as described.

4. A construction containing the elements in combination defined in claim 1, combined with hooks open at their rear sides and located one at the upper front corner of each of said supporting and track members, and above the upper track edges thereof and engaged by said first named rollers when in forward position.

5. In combination with a supporting frame, a dumping body located above the frame, a track associated with and extending longitudinally of the frame, said track having an elevated horizontal portion and a downwardly and rearwardly inclined portion, supporting means on said body between its ends traversably mounted on said track, said means permitting a tilting movement of the body on a horizontal axis, and means for moving said supporting means onto the horizontal portion of the track when the body is in horizontal position and for moving the supporting means onto the inclined portion of the track and traversing the same from front to rear thereof when the rear end of the body is tipped downwardly.

6. In combination with a supporting frame, a dumping body located above the frame, a track associated with and extending longitudinally of the frame, said track having an elevated horizontal portion and a joining downwardly rearwardly inclined portion, supporting means on said body between its ends traversably mounted on said inclined and horizontal portions of the track, said means permitting a tilting movement of the body on a horizontal axis, and a link pivotally connected at one end to said frame and pivotally connected at its opposite end to said body.

7. In combination with a supporting frame, a dumping body located above the frame, a track associated with and extending longitudinally of the frame, said track having an elevated horizontal portion and a joining downwardly rearwardly inclined portion, supporting means on said body between its ends traversably mounted on said inclined and horizontal portions of the track, said means permitting a tilting movement of the body on a horizontal axis, and a link pivotally connected at one end to said frame and at its other end to said body.

8. The combination with a supporting frame, a dumping body located above said frame, a track associated with and extending longitudinally of the frame, said track having an elevated horizontal portion and a downwardly rearwardly inclined portion, two spaced apart members on said body between its ends, one being located rearward of the other and each transversably engageable with said track whereby the body is supported for tilting on a horizontal axis and longitudinal movement, and means for causing said forward member to engage the horizontal portion of the track when the body is in substantially horizontal position at which position the rear member is disengaged from the track, said means causing said members to traverse the track as the body is tipped and the tipping of said body from horizontal to downwardly rearwardly inclined position causing said rear means to engage the inclined portion of the track.

9. The combination with a supporting frame, a dumping body located above said frame, a track associated with and extending longitudinally of the frame, said track having an elevated horizontal portion and a downwardly rearwardly inclined portion, two spaced apart members on said body between its ends, one being located rearward of the other and each traversably engageable with said track whereby the body is supported for tilting on a horizontal axis and longitudinal movement, and a link pivotally connected at its respective ends to said frame and to said body for causing said forward member to engage the horizontal portion of the track when the body is in substantially horizontal position at which position the rear member is disengaged from the track, said members to traverse the track as the body is tipped and the tipping of said body from horizontal to downwardly rearwardly inclined position causing said rear means to engage the inclined portion of the track.

10. In combination with a supporting frame, a dumping body located above the frame, two supporting members on said body spaced apart longitudinally thereof, the forward of said supporting members being located in a position not rearwardly of the longitudinal center of gravity of said body, and track means traversably engaged by said supporting members, said supporting members and track means being so arranged that said body is supported wholly by said forward supporting member when the body is in substantially horizontal position.

11. In combination, a supporting frame, a dumping body located above the frame, two supporting members on said body, the forward of said supporting members being located not rearwardly of the longitudinal center of gravity of said body, and track means on the frame for each of the supporting members, said track means for the rear supporting member being located a distance below the same when the body is in normal horizontal position and said track means for the forward supporting member being so arranged that no downward movement of the same is initially permitted but rearward movement may be had.

12. In combination with a supporting frame, a dumping body located above the frame, only two supporting members on said body spaced longitudinally thereof and track means traversably engaged by said supporting members, said body having its center of gravity not forwardly of the forward one of said supporting members whereby release of the body causes it to tilt downwardly about the axis of said forward supporting member, said portion of track means engaged by the rearwardly positioned supporting member being sloped downwardly towards the rear, said rearward supporting member being considerably spaced from the said track means whereby its impact therewith will cause a shifting of the body rearwardly.

13. In combination, a supporting frame, a dumping body located above the frame, two supporting members on said body, the forward of said said supporting members being located not rearwardly of the longitudinal center of gravity of said body, a track means on the frame for each of the supporting members, and means co-acting with the rearward supporting member when it is in its rear position to prevent displacement of the same upwardly.

In testimony whereof I affix my signature.

EDWARD R. BARRETT.